United States Patent [19]
Boehmer et al.

[11] Patent Number: 5,749,394
[45] Date of Patent: May 12, 1998

[54] CHECK VALVE INCLUDING MOLDED VALVE SEAT

[75] Inventors: Dennis A. Boehmer, Beavercreek; Richard L. Gibson, Jr., Springfield, both of Ohio

[73] Assignee: Vernay Laboratories, Inc., Yellow Springs, Ohio

[21] Appl. No.: 728,496

[22] Filed: Oct. 9, 1996

[51] Int. Cl.⁶ .................................................. F16K 15/00
[52] U.S. Cl. .................. 137/533.15; 251/363; 251/364
[58] Field of Search ...................... 137/533.15, 533.11, 137/539, 519.5; 251/363, 364

[56] References Cited

U.S. PATENT DOCUMENTS

| | | | |
|---|---|---|---|
| 1,362,526 | 12/1920 | Cheek | 251/361 |
| 1,380,415 | 6/1921 | Putnam | 137/533.11 |
| 1,555,068 | 9/1925 | Nixon | 137/533.15 |
| 1,764,186 | 6/1930 | Teesdale | 137/533.15 |
| 1,829,022 | 10/1931 | Stevenson | 137/533.15 |
| 2,137,402 | 11/1938 | Hoferer et al. | 137/533.15 |
| 2,203,759 | 6/1940 | Ware | 137/533.15 |
| 2,790,460 | 4/1957 | Radd | 137/533.15 |
| 3,620,653 | 11/1971 | Gaylord et al. | 137/533.15 |
| 3,770,001 | 11/1973 | Davis | 137/533.15 |
| 4,197,875 | 4/1980 | Schieferstein et al. | 137/533.11 |
| 4,781,213 | 11/1988 | Kilayko | 137/533.15 |
| 5,012,867 | 5/1991 | Kilgore | 137/533.15 |
| 5,232,014 | 8/1993 | Hiltebrand | 137/533.15 |
| 5,339,785 | 8/1994 | Wilksch | 123/457 |
| 5,507,312 | 4/1996 | Dillman | 137/533.15 |

*Primary Examiner*—Denise L. Ferensic
*Assistant Examiner*—Joanne Y. Kim
*Attorney, Agent, or Firm*—Biebel & French

[57] ABSTRACT

A ball check valve including a housing and a ball element movably positioned in the housing. An insert member is located at an inlet port of the housing, and an elastomeric element is molded directly onto the insert member and is positioned facing toward an outlet port of the housing for engagement with the ball element. A ball seat is ground into the elastomeric element at a precise angle matching a tangential angle of contact with the ball element such that engagement of the ball element with the ball seat forms a seal preventing fluid flow from the outlet port through the inlet port.

11 Claims, 3 Drawing Sheets

5,749,394

CHECK VALVE INCLUDING MOLDED VALVE SEAT

BACKGROUND OF THE INVENTION

1. Field of the Invention

The present invention relates to check valves, and more particularly, to check valves incorporating a ball element for cooperating with an elastomeric valve seat.

2. Description of Related Art

Ball check valves typically comprise a spherical ball element retained within a housing and movable in a longitudinal direction within a flow path into and out of contact with a valve seat which is preferably configured to form a fluid seal with the ball element. Prior art check valves have incorporated ring-shaped elastomeric elements to form the valve seat and thereby provide a resilient contact surface for the ball element. It has been noted, however, that prior art check valves incorporating ring-shaped elastomeric elements have been subject to misalignment and distortion, resulting in an imperfectly shaped seat area for receiving the ball element. In addition, prior art seal elements have included a peripherally extending seam or parting line formed during the molding operation for forming the sealing element. These imperfections in construction of the check valve sealing elements result in an imperfect seat area being provided for the ball element, which in turn reduces the effectiveness of the seal to prevent flow through the valve.

U.S. Pat. No. 4,197,875 discloses a ball check valve including a soft elastomeric sealing element which is designed to avoid distortion of the sealing surface when pressure is applied from a ball element. The sealing element is formed with surfaces having a predetermined contour wherein the sealing element is placed within a base and held in position by a housing threadably engaged within the base. However, this patent does not address the possibility of the seating area for the ball element distorting or moving from its as-molded shape when it is installed and compressed in position by the base and housing.

In addition to it being difficult to ensure that an elastomeric part is accurately positioned, it is difficult to ensure a high degree of precision for the seating area since small distortions of the elastomeric element may occur in going from the mold to its position within a check valve housing. Further, the precision available through molding operations is limited and is difficult to maintain and ensure during mass production of parts.

Accordingly, there is a need for a check valve including an elastomeric seat wherein the elastomeric seat is precisely formed.

Further, there is a need for providing a precisely formed elastomeric seat which may be assembled into a check valve without distorting the seat.

SUMMARY OF THE INVENTION

The present invention provides a ball check valve including a housing having a through bore defining a fluid passage. Inlet and outlet ports are defined at opposing ends of the fluid passage to convey fluid into and out of the housing.

A ball element is movably positioned in the housing between the inlet and outlet ports. The ball element is adapted to move longitudinally within the fluid passage to control fluid flow through the housing.

An insert member is located at the inlet port and includes an interior surface defining a through aperture. The through aperture is in fluid communication and aligned with the through bore of the housing, and the insert member operates to maintain the ball element in place within the housing. An elastomeric element is molded onto the insert member prior to insertion of the insert member into the housing. The elastomeric element includes a sealing bead positioned across a forward end portion of the insert member for forming a seal between the insert member and an insert seat on the housing. The elastomeric element also includes a tubular portion extending in contact with the interior surface of the insert member in order to facilitate formation and retention of the elastomeric element on the insert member. A ball seat is formed on the elastomeric element at an end of the through aperture by a grinding operation subsequent to the molding operation. The grinding operation provides an accurate and consistent valve seat angle whereby the valve seat is precisely formed to match a tangential angle of contact with the ball element and thereby provide a fluid tight seal for the check valve.

Therefore, it is an object of the invention to provide a ball check valve including a molded valve seat.

It is a further object of the invention to provide a ball check valve having a seat molded in place on a rigid structure of the valve.

It is yet another object of the invention to provide such a check valve wherein the seat for engaging a ball element is ground to precise dimensions.

Other objects and advantages of the invention will be apparent from the following description, the accompanying drawings and the appended claims.

DETAILED DESCRIPTION OF THE PREFERRED EMBODIMENT

Figure 1:
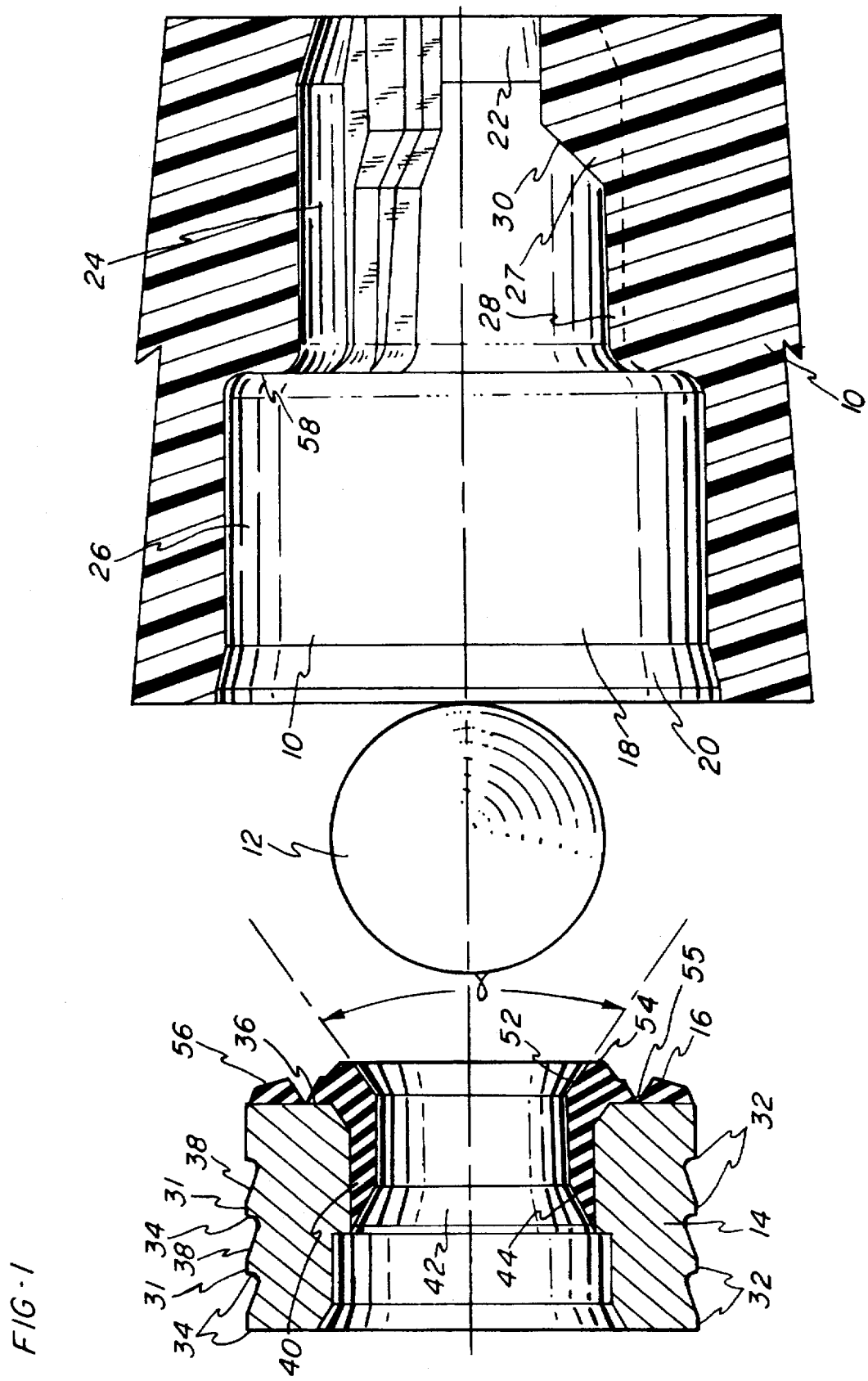
FIG. 1 is an exploded side sectional view of the ball check valve of the invention.

Referring to FIG. 1, the ball check valve of the present invention comprises a housing 10, a ball element 12, an insert member 14 and an elastomeric element 16 formed on the insert member 14. In the preferred embodiment, the housing 10 is formed of a plastic material, the ball element is formed of a metal or glass material, the insert member 14 is formed of a metal material and the elastomeric element 16 is formed of an elastomeric material such as a fluoroelastomer or equivalent.

Figure 2:
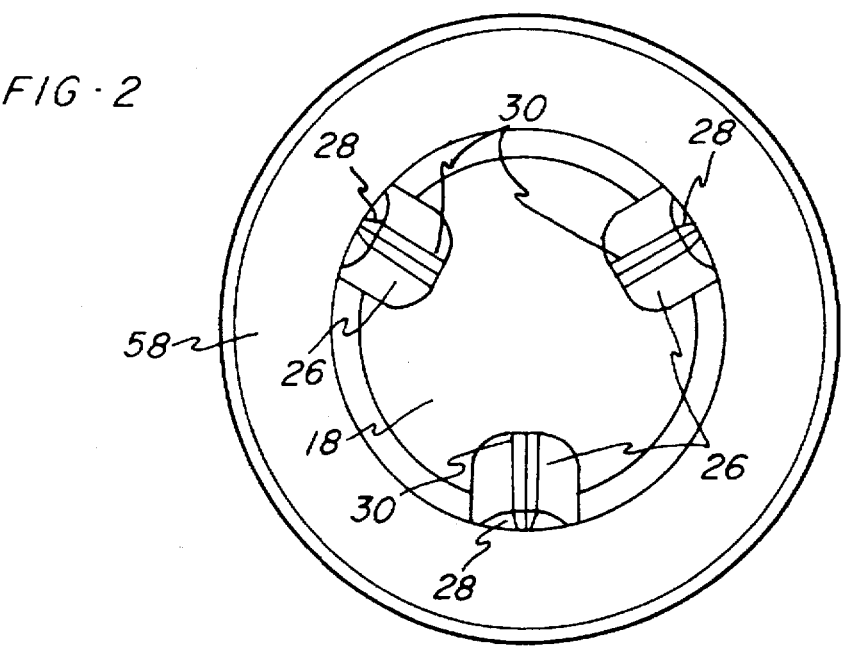
FIG. 2 is an end view of the housing for the valve, as seen from an inlet end.

The housing 10 includes a through bore 18 defining a fluid passage therethrough and an inlet port 20 and outlet port 22 located at opposing ends of the fluid passage defined by the bore 18. The bore 18 defines a first diameter, located in the area 24 and a second diameter, located in the area 26, wherein the second diameter of area 26 is greater than the first diameter of area 24. The ball element 12 is received in the first diameter area 24, and the diameter of the area 24 is larger than the diameter of the ball 12 such that fluid may flow between the ball 12 and the wall of the bore 18 in the area 24 during fluid flow from the inlet port 20 to the outlet port 22. In addition, as may be further seen in FIG. 2, the area 24 includes three radially inwardly extending rib portions 27 wherein each rib portion 26 includes a ball support portion 28 and a stop portion 30. The ball support portion 28 maintains the ball element 12 in spaced relation relative to the wall of the area 24, and the stop portion 30 limits the movement of the ball element 12 in the direction of the outlet port 22.

The insert member 14 is dimensioned to be received within the second diameter area 26, and includes an exterior surface defining a plurality of circumferentially extending barbs 32. The barbs 32 are defined by a substantially vertical surface 34 extending substantially parallel to a forward end face 36 of the insert member 14, and by outwardly angled surfaces 38 facing toward the forward end face 36 and connected to respective vertical surfaces 34. In addition, it should be noted that the connecting area between the vertical surfaces 34 and the angled surfaces 38 may be formed by flat portions 31 wherein the diameter of the flat portion 31 preferably corresponds to the outer diameter of metal bar stock from which the insert member 14 is formed. In this manner, the outer dimension of the barbs 32 may be accurately controlled wherein the outer dimension is slightly greater than the dimension of the second diameter area 26 to obtain a sealed fit within the housing 10 as the insert member 14 is pressed into the second diameter area 26.

Figure 3:
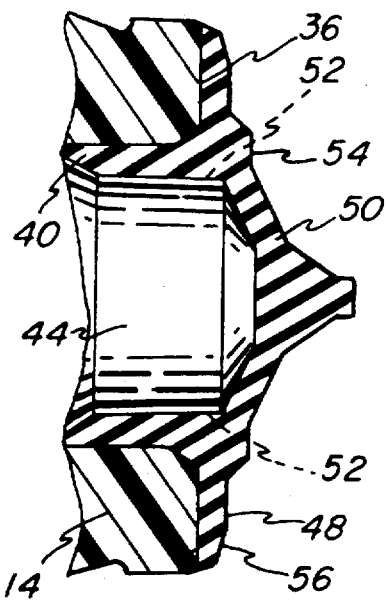
FIG. 3 is a side sectional view of the insert member subsequent to a molding operation applying the elastomeric element and prior to grinding of the ball seat.
Figure 4:
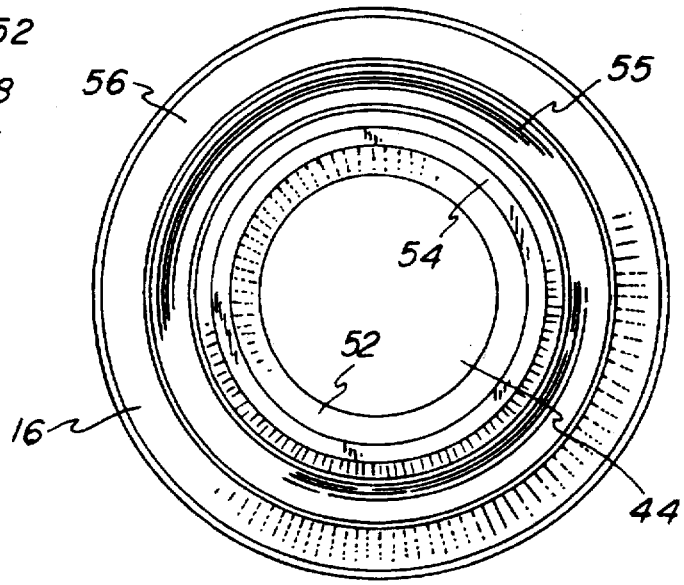
FIG. 4 is an end view of the insert member after grinding of the elastomeric element to form the ball seat.

The elastomeric element 16 is molded onto the insert member 14 and includes a tubular portion 40 extending within a through aperture 42 defined by an interior surface 44 of the insert member 14 in order to facilitate retention and provide stability of the elastomeric element 16 on the insert member 14. Referring to FIG. 3, the elastomeric element 16 is molded onto the forward end portion 36 of the insert member 14 and includes the tubular portion 40 and a radially outwardly extending flange portion 48 formed integrally with the tubular portion. In addition, a dome shaped flashing portion 50 is formed extending over the through aperture 44 of the insert member 14. Subsequent to the molding operation, the flashing portion 50 is ground away to form an angled or conical shaped ball seat 52. The elastomeric element 16 is further provided with a raised annular ridge 54 defining a peripheral supporting structure for the ball seat 52. Further, subsequent to the formation of the ball seat, an annular groove 55 is cut or machined in the flange portion 48 to define a sealing bead 56 located radially outwardly from the ball seat 52 (FIG. 4). The sealing bead 56 is located to engage an insert seat 58 (FIG. 1), located at a transition between the first and second areas 24, 26, to form a seal between the insert member 14 and the housing 10. The seal thus formed prevents fluids from leaking from the housing 10 at the interface between the exterior surface of the insert member 14 and the second diameter area 26 when fluid pressure is applied in a direction from the outlet port 22 toward the inlet port 20.

It should be noted that by molding the elastomeric element 16 in place on the insert member 14, as opposed to molding an element and then positioning it on an insert member, the insert member 14 defines a rigid substrate for preventing movement of the surface defining the ball seat 52 subsequent to the operation of grinding the ball seat to precise dimensions. The tubular portion 40 further provides supporting material adjacent to the ball seat 52 which prevents shifting or distorting movements of the ball seat 52. Further, performing a grinding operation to define the ball seat 52 enables the seat 52 to be formed with a higher degree of accuracy than that available through a molding operation. Thus, the ground seat 52 formed on the molded in place insert element 16 provides for better control of the angle and roundness of the ball seat 52, as well as eliminating problems of surface flow of the elastomeric material. It should also be apparent that as a result of using a grinding operation, any seam lines or other surface irregularities resulting from the molding operation will be eliminated. Further, the present construction of molding the elastomeric element 16 in place allows a lower volume of the elastomeric material to be used in the area of the ball seat 52, resulting in reduced swell of the elastomeric element 16 when it comes into contact with a fluid.

Figure 5:
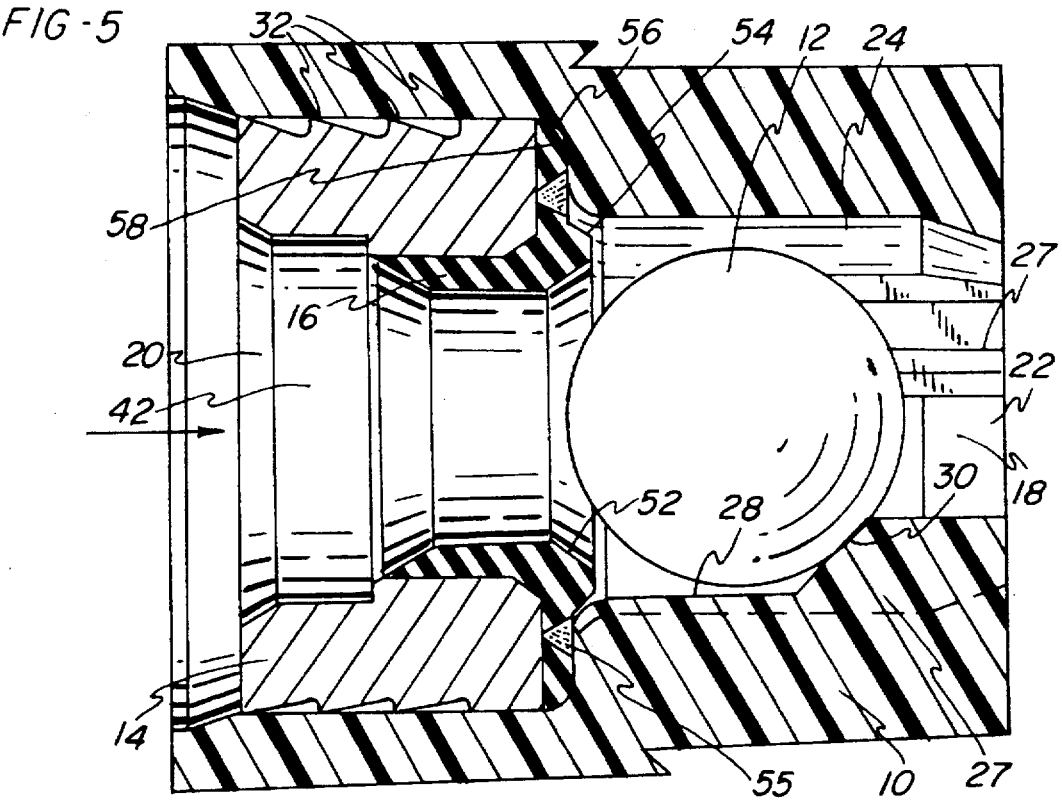
FIGS. 5 and 6 are, respectively, side sectional views of the valve of FIG. 1 in open and closed positions.
Figure 6:
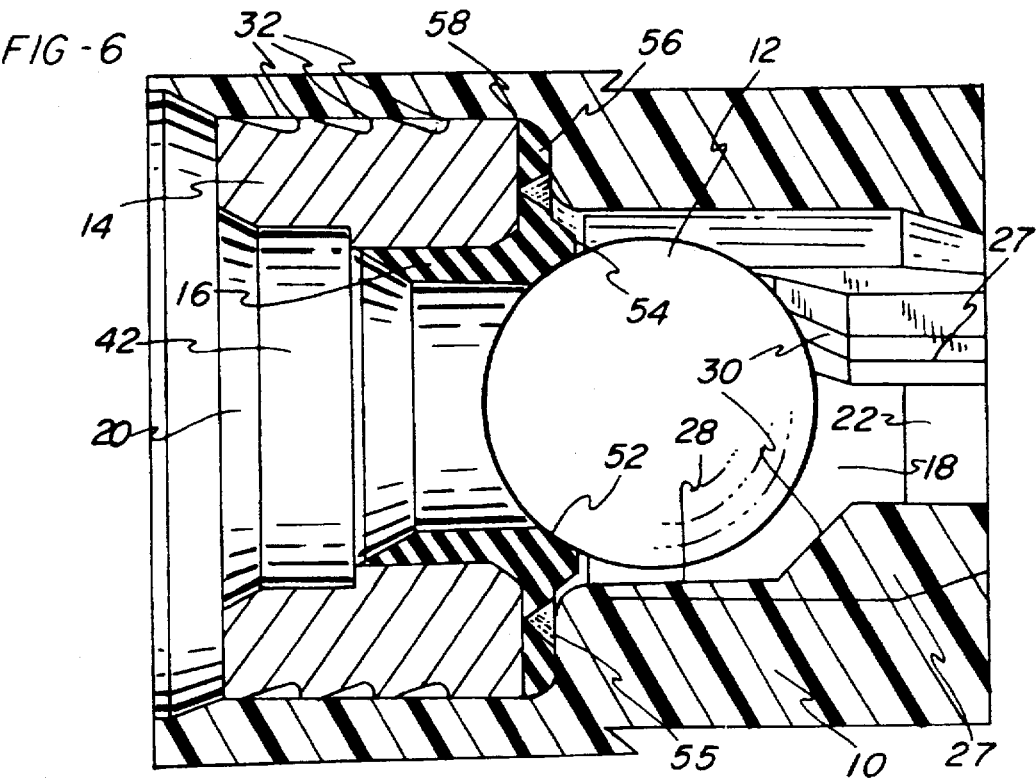

FIGS. 5 and 6 illustrate the assembled ball check valve wherein the insert element 14 has been pressed into the through bore 18 of the housing 10 to retain the ball element 12 in the first diameter area 24 and the ball seat 52 is positioned for engagement with the ball element 12. As seen in FIG. 5, the ball element 12 is positioned out of engagement with the ball seat 52 for forward flow of fluid through the check valve from the inlet port 20 to the outlet port 22. In this mode of operation, the ball element 12 is located in engagement with the stop portions 30 and fluid is permitted to flow through the through aperture 44, past the ball seat 52 and around the ball element 12.

FIG. 6 illustrates operation of the check valve in a reverse flow condition wherein fluid pressure from the outlet port 22 toward the inlet port 20 causes the ball element 12 to move longitudinally through the bore 18 into engagement with the ball seat 52 to thereby form a seal for preventing fluid flow in the reverse direction from the outlet port 22 to the inlet port 20. It should be noted that the angle of the ball seat 52 is selected such that it is tangential with the ball element 12 at the point of contact. In the embodiment illustrated, the tangential angle of contact α for the ball seat 52 is 70° (see FIG. 1). Further, it should be noted that the selected angle of contact α for the ball seat 52 also prevents the ball element 12 from sticking or corking in the seat 52.

With reference to FIGS. 5 and 6, it should be noted that the point of sealing contact between the elastomeric element 16 at the sealing bead 56 and the insert seat 58 is located radially outwardly from the area of the ball seat 52, and that the groove 55 defines a gap between the sealing bead 56 and the annular ridge 54 surrounding the ball seat 52 such that compressive forces applied to form sealing contact between the sealing bead 56 and the insert seat 58 will not transfer to the annular ridge 54. Thus, the present design for the check valve ensures that the area of the ball seat 52 is isolated from any distortions which may occur to the elastomeric element 16 as a result of contact between the sealing bead 56 of the elastomeric element 16 and the housing 10 to form the peripheral seal for preventing fluid flow around the outside of the insert member 14.

From the above description, it should be apparent that the present ball check valve provides a construction wherein precise formation of the ball seat is insured. Further, the present design ensures that the ball seat will avoid distortion during assembly of the check valve by providing the ball seat formed directly on a rigid insert member, and isolating the ball seat from any distortions during assembly of the elastomeric element and insert member into the housing.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A check valve comprising:

a housing including a through bore defining a fluid passage, and an inlet port and an outlet port located at ends of said fluid passage;

a ball element movably positioned in said housing and located between said inlet port and said outlet port;

a rigid insert member located at said inlet port, said insert member including an interior surface defining a through aperture;

an elastomeric element molded onto said insert member such that said elastomeric element is bonded to said insert member to form a unitary structure for insertion into said housing during assembly of said valve, said insert member defining a substrate supporting said elastomeric element facing said outlet port for engagement with said ball element; and wherein said insert member immovably supports said elastomeric element to facilitate grinding of a ball seat into said elastomeric element, said ball seat being formed in said elastomeric element at a precise angle matching a tangential angle of contact with said ball element such that engagement of said ball element with said ball seat forms a seal which prevents fluid flow from said outlet port through said inlet port.

2. The check valve of claim 1 wherein said insert member includes a forward end face facing toward said outlet port, and said elastomeric element includes a forward portion extending radially outwardly across said forward end face and an elongated tubular portion extending through said aperture in said insert member and bonded to said interior surface of said insert member to facilitate retention of said elastomeric element on said insert member.

3. The check valve of claim 1 wherein said through bore includes a first diameter and a second diameter greater than said first diameter, and said insert member is positioned in said second diameter.

4. The check valve of claim 3 wherein said insert member includes a forward end portion facing toward said outlet port and said elastomeric element includes a circumferentially extending sealing bead located radially outwardly from said ball seat and positioned across said forward end portion, and said housing includes an insert seat facing toward said forward end portion, said sealing bead located in engagement with and forming a seal between said forward end portion and said insert seat.

5. The check valve of claim 4 including a circumferentially extending annular groove defined by said elastomeric element between said ball seat and said sealing bead such that said annular groove is located on said forward end portion radially outwardly from said ball seat and radially inwardly from said sealing bead.

6. The check valve of claim 1 wherein said insert member includes an exterior surface defining barbs positioned in engagement with said through bore of said housing to thereby maintain said insert member in position within said housing.

7. A check valve comprising:

a housing including a through bore defining a fluid passage, and an inlet port and an outlet port located at ends of said fluid passage;

said through bore defining a first diameter and a second diameter larger than said first diameter, and including an insert seat at an interface between said first diameter and said second diameter;

a ball element movably positioned in said first diameter of said through bore and located between said inlet port and said outlet port;

a rigid insert member located at said inlet port in said second diameter of said bore, said insert member including an exterior surface and an interior surface defining a through aperture;

an elastomeric element molded onto said insert member such that said elastomeric element is bonded to said insert member to form a unitary structure for insertion into said housing during assembly of said valve, said insert member defining a substrate supporting said elastomeric element facing said outlet port for engagement with said ball element; and wherein said insert member immovably supports said elastomeric element to facilitate grinding of a ball seat into said elastomeric element, said ball seat being formed in said elastomeric element at a precise angle matching a tangential angle of contact with said ball element such that engagement of said ball element with said ball seat forms a seal which prevents fluid flow from said outlet port through said inlet port.

8. The check valve of claim 7 wherein said insert member includes a forward end portion facing toward said outlet port adjacent to said insert seat, and said elastomeric element includes a circumferentially extending sealing bead positioned across said forward end portion and located radially outwardly from said ball seat, said sealing bead located in engagement with said insert seat and forming a seal between said forward end portion and said insert seat.

9. The check valve of claim 8 including a circumferentially extending annular groove defined by said elastomeric element between said ball seat and said sealing bead such that said annular groove is located on said forward end portion radially outwardly from said ball seat and radially inwardly from said sealing bead.

10. The check valve of claim 7 wherein said insert member includes an exterior surface defining barbs positioned in engagement with said through bore of said housing to thereby maintain said insert member in position within said housing.

11. The check valve of claim 10 wherein said barbs are formed by substantially vertical surfaces extending substantially parallel to said forward end portion, and outwardly angled surfaces extending from connecting areas adjacent to respective vertical surfaces and facing toward said forward end portion.

* * * * *